Sept. 12, 1967 P. R. KUENG 3,340,689
TURBOJET BYPASS ENGINE
Filed Feb. 10, 1966 4 Sheets-Sheet 1

INVENTOR
Paul Robert Kueng
BY
Michael S. Striker
ATTORNEY

Sept. 12, 1967 P. R. KUENG 3,340,689
TURBOJET BYPASS ENGINE
Filed Feb. 10, 1966 4 Sheets-Sheet 4

INVENTOR
Paul Robert Kueng
BY
Michael S. Striker
ATTORNEY

United States Patent Office 3,340,689
Patented Sept. 12, 1967

3,340,689
TURBOJET BYPASS ENGINE
Paul Robert Kueng, 67 Brunnadernstrasse,
3000 Bern, Switzerland
Filed Feb. 10, 1966, Ser. No. 526,465
Claims priority, application Switzerland, Sept. 16, 1961,
10,827/61
17 Claims. (Cl. 60—226)

The present application is a continuation-in-part application of my copending application, "Turbojet Engine With Three Air-Stream Cycles," Ser. No. 217,047, and filed on Aug. 15, 1962, now abandoned.

The present invention relates to a turbojet bypass engine for an aircraft, and more particularly to a jet propulsion plant of the type including an air duct in which a turbine, a compressor, and a turbofan are located, and a ramjet bypass duct with fuel burners.

It is one object of the invention to provide a turbojet bypass engine which operates at great efficiency at a low starting speed as well as at supersonic speed.

Another object of the invention is to use a ramjet bypass duct for producing thrust at standstill and low speed of the aircraft.

Another object of the invention is to provide a turbojet for producing the initial thrust, and a ramjet for producing high thrust at supersonic speed, while the turbojet idles.

Another object of the invention is to render a ramjet effective at low speed or at a standstill by drawing air into the same by a stream of combustion gases having an injector pump effect.

Another object of the invention is to provide a turbojet bypass engine having a low fuel consumption at high supersonic speeds.

With these objects in view, the present invention relates to a turbojet bypass engine of the type including a turbojet, and a ramjet. One embodiment of the invention comprises a duct system including an air duct, a ramjet bypass duct, and a combustion duct connecting the air duct with the ramjet bypass duct; a turbojet located in the air duct; first fuel burner means in the combustion duct producing a flow of combustion gases into the ramjet bypass duct; and second fuel burner means in the ramjet bypass duct.

Assuming that the aircraft supporting the turbojet bypass engine is to take off, the burner of the turbojet is started, so that the turbine rotates and drives a compressor and turbofan, while a thrust is produced at the outlet of the air duct. A the same time, the first burner means in the combustion duct, and the second burner means in the ramjet bypass duct are started. The first burner causes combustion gases to flow out of the combustion duct into the ramjet bypass duct and the combustion gases have an injector pump effect and draw air into the inlet of the ramjet bypass duct so that sufficient air is provided for combustion of fuel supplied by the second burner means in the ramjet bypass duct, and another thrust is produced at the outlet of the ramjet bypass duct in addition to the thrust produced by the turbojet at the outlet of the air duct. When the aircraft takes off and operates at subsonic speed, more fuel is supplied to the second burner means in the ramjet bypass duct so that the thrust is increased and the aircraft accelerated so that more air flows into the ramjet bypass duct.

When the aircraft has climbed to the desired height and operates at the desired speed, the second burner means are fully operative with air rammed into the inlet of the ramjet bypass duct, while the fuel supply to the turbojet can be reduced so that the same idles and the power plant operates at high efficiency as ramjet only.

In the preferred embodiment of the invention, the combustion duct is connected with a portion of the air duct which is disposed rearwardly of the turbofan of the turbojet so that air is blown into the combustion duct to produce a high injection thrust of the combustion gases flowing from the combustion duct into the ramjet bypass duct.

It is advantageous to provide an air duct portion supplying to the combustion duct air which has not passed through the turbofan. Preferably, an overflow duct connecting the air duct with the ramjet bypass duct is provided forwardly of the combustion duct, and can be opened and closed by a suitable flap or other air valve.

In accordance with the invention, flow control means are provided in the duct system for controlling and adjusting the flow of gases through the same in accordance with the different conditions prevailing at the standstill of the aircraft, at low speed, and at high supersonic speed.

The air flow control means preferably include adjustable nozzle means located at the outlet of the air duct and at the outlet of the ramjet bypass duct. Blade-shaped air guide means are advantageously provided forwardly of the air duct and ramjet duct and are operable for varying the amount of air flowing into the duct system.

It is preferred to provide two ramjet bypass ducts on opposite sides of a central air duct which houses the turbojet. In one embodiment of the invention, the air duct and the two ramjet bypass ducts have adjacent front inlets. In another embodiment of the invention, a common inlet duct is provided forwardly of the inlets of the ramjet bypass duct and of the air duct, and in order to control the amount of air flowing into the ramjet bypass ducts, means are provided for opening and closing the inlets of the same and for adjusting the amount of air flowing from the inlet duct into the ramjet bypass ducts.

The jet engines according to the invention may be mounted in the wings of the aircraft or directly under the same, in which event it is advantageous to provide air guide means for controlling the flow of the boundary layer into the ramjet bypass duct.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
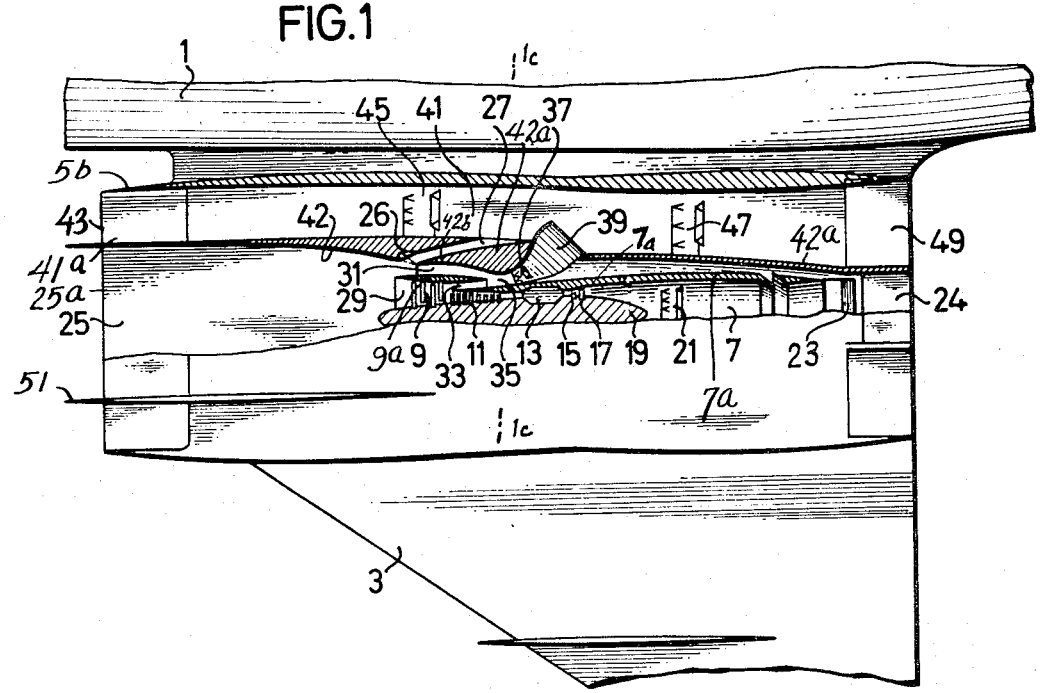
FIG. 1 is a fragmentary plan view, partially in a horizontal axial section, illustrating one embodiment of the invention.
Figure 1A:
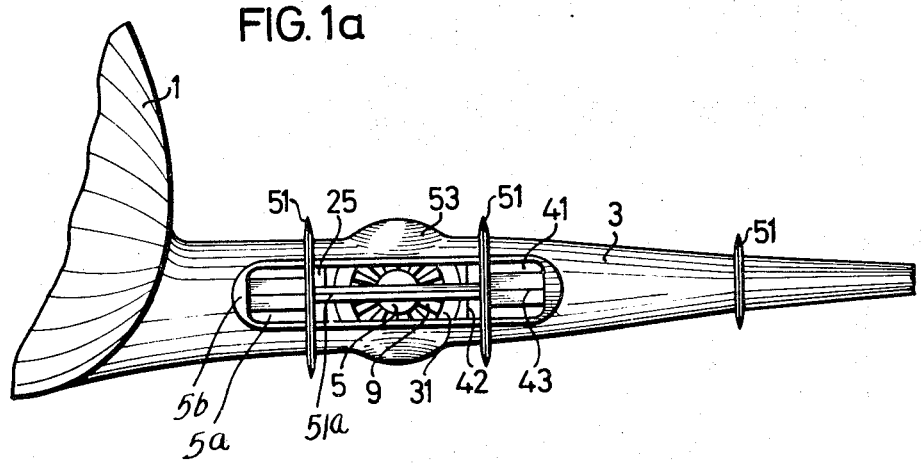
FIG. 1a is a front view of the embodiment of FIG. 1.

Referring now to the drawings, and more particularly to FIGS. 1 and 1a, the fuselage 1 of an aircraft has wings 3 of which only one is partially shown. A jet engine 5 according to the invention is mounted within each wing near the wing root. The top and bottom walls of the wing have bulges 53 providing a housing for jet engine 5. The leading edge of the wing is formed with an elongated opening 5a bounded by a correspondingly shaped annular inlet duct portion 5b which forwardly projects from the wing, so that air enters a duct system which includes an air duct 25 bounded by an annular wall 42, and a pair of ramjet bypass ducts 41 located on opposite sides of the central air duct 25 in the main plane of the wing. A turbojet is located in air duct 25 and includes a high pressure turbine wheel 15, a low pressure turbine wheel 17, a guide body 19, a compressor 11, and a turbofan 9 envelopped by a tubular housing 9a. A tubular part 7a forms an annular combustion chamber 13 with guide body 19, and fuel burner means, not shown, are provided in the annular combustion chamber 13, for driving turbine wheels 15 and 17. An after-burner 21 is provided rearwardly of the turbine wheels and guide body 19. The construction of the turbojet is known, and not an object of the invention. The exhaust gases flow into an outlet thrust nozzle 23, and are discharged at the trailing edge of wing 3 through adjustable flow control means 24 provided in the outlet of air duct means 25 whose rear portion is bounded by a tubular wall 42a.

Ramjet bypass ducts 41 have inlets 41a located on opposite sides of the tubular wall 42 adjacent the inlet 25a of air duct 25. Two flow control means in the form of blade-like guide means 43 are mounted in inlets 41a, and are adjustable about a horizontal axis for varying the amount of air entering bypass ducts 41. Overflow ducts 27 pass through wall 42 and connect air duct 25 with bypass ducts 41. A flap or other valve means 26 is pivotally mounted adjacent each overflow conduit 27 for opening and closing the same.

Figure 1C:
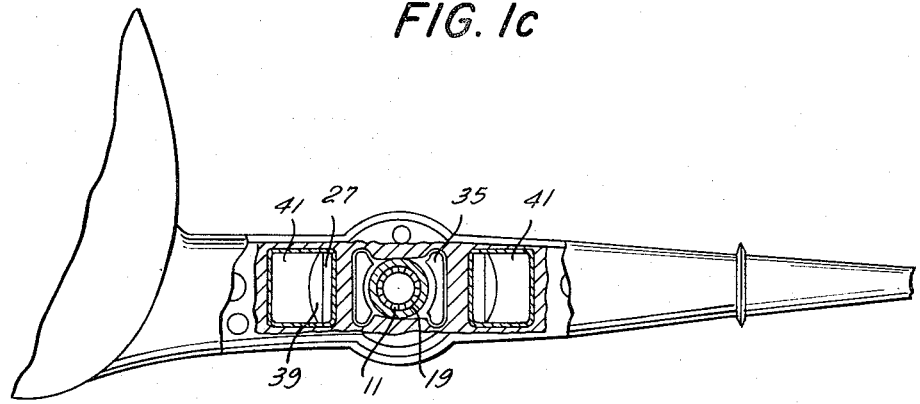
FIG. 1c is a cross-sectional view taken on line 1c—1c in FIG. 1.

The tubular wall 9a of turbofan 9 defines with the correspondingly shaped wall portion 42b duct means 31 which lead into a pair of duct portions 35, as best seen in FIG. 1c.

Air entering air duct 25 and the central conduit 29 of annular wall 9a of turbofan 9 passes partly into compressor 11, and partly through an annular air duct portion 33 into duct portions 35 in which it mixes with air entering through air duct means 31.

Two combustion duct means 39 adjacent wall 42a concent duct portions 35 of air duct means 25 with the two bypass ducts 41, respectively, only one half of the duct system being shown in FIG. 1 for the sake of simplicity.

First fuel burner means 37 are mounted in combustion ducts 39 in the region of the inlets thereof so that air entering combustion ducts 39 mixes with fuel which is burned to produce combustion gases flowing into bypass ducts 41. Due to the curved shape of combustion ducts 39, and the position of the outlets of the same, the combustion gases move rearwardly in bypass ducts 41 and out of the rear outlets of the same in which flow adjusting means 49 are provided.

Consequently, an injection pump effect is produced by the streams of combustion gases discharged from combustion ducts 39 into bypass ducts 41, and air is drawn into inlets 41a of the two bypass ducts 41. Second burner means are provided in the bypass ducts 41, and include main fuel burner means 45 and after-burner means 47, respectively located forwardly and rearwardly of combustion ducts 39 and overflow ducts 27.

Figure 1B:
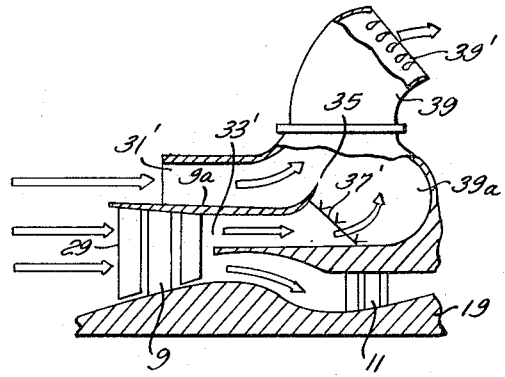
FIG. 1b is an axial sectional view illustrating a modification.

A modified inlet construction is shown in FIG. 1b in which fuel burner means 37' are located at the ends of duct means 33' which receive air from the central conduit 29. The combustion gases mix in chambers 39a with air entering through ducts 31' and are discharged into bypass ducts 41 through ducts 39' of turnable nozzles.

Forwardly of the opening 5a and inlet duct portion 5b, two vertical air guiding blades 51, and a horizontal air guiding blade 51a are stationarily mounted on wing 3.

The turbojet bypass engine shown in FIGS. 1, 1a, and 1c operates as follows:

The burner means in combustion chamber 13 and afterburner 21 are started so that turbine 7 rotates and drives turbofan 9 and compressor 11. Air is sucked through inlet 25a into air duct 25 by turbofan 9 and flows into duct portions 29 and 31. The air flowing into duct portion 29 is compressed by compressor 11 and supplied to the combustion chamber 13, where combustion gases develop to drive turbine wheels 15 and 17 so that a thrust is developed at the outlet of air duct 25 in the region of the trailing edge of the wing.

Part of the air driven by turbofan 9 flows through duct portion 33 into mixing duct portions 35 where it mixes with air entering through annular duct portion 31.

The air is driven into combustion ducts 39 mixed with fuel provided by burners 37, and burned so that combustion gases flow through combustion ducts 39 into bypass ducts 41 moving at great speed in rearward direction. Assuming the the aircraft is at a standstill, and that no air is rammed into the inlets 41a of bypass ducts 41, air is nevertheless drawn into bypass ducts 41 by the injector effect of the combustion gases entering the bypass ducts through combustion ducts 39. The amount of air is controlled by operation of air guiding means 43. Main burners 45 mix fuel with the air flowing in bypass ducts 41, so that the ignited fuel produces combustion gases flowing readwardly in bypass ducts 41. The fuel is completely burned by after-burners 47, and the combustion gases are discharged through flow control means 49 in the outlets of bypass ducts 41 to produce thrust which is added to the thrust produced by the combustion gases discharged by turbine 7 from the rear end of air duct 25.

Since the ramjet bypass ducts 41 and burners 45, 47 are used in this manner even while the aircraft is at a standstill, a very high thrust is produced facilitating the rapid take-off of the aircraft. The same operation takes place during the acceleration of the aircraft to high subsonic speeds. Since additional air enters inlets 41a of bypass ducts 41, a greater amount of fuel is burned by burners 45.

When the aircraft reaches a speed in the range of 2.5 Mach, the thrust of the turbojet 7 is no longer required since the ramjet bypass ducts 41 operate now at high efficiency as ramjets due to the fact that air is rammed into the inlets of the ramjet bypass ducts 41. Turbine 7 idles, and only the ramjets 41, 45, 47 propel the aircraft. It will be appreciated, that this mode of operation results in very high efficiency, rapid take-off of the aircraft, and fast acceleration to supersonic speeds.

Flow control means 43, 49, and 24 permit the adaptation of the amounts of air flowing through the duct system under varying operational conditions.

In the modification of FIG. 1b, only the air supplied by fan 9 is mixed with burning fuel discharged by burners 37'. The combustion gases in mixing chambers 39a are mixed with air entering the mixing chambers 39a and combustion ducts 39 directly through ducts 33'.

Referring now to the embodiment of FIGS. 2 and 2a, the general arrangement of turbojet bypass engines 60 in wings 3 of the aircraft is as described with reference to FIGS. 1 and 1a. The turbojet construction is the same as illustrated in FIG. 1, and the turbine 62 drives a compressor and a turbofan. The annular wall 9a which surrounds the turbofan forms an annular conduit 31, not shown in FIG. 2, with the annular wall 42b, and as described with reference to FIG. 1, the air is pressed by turbofan 9 through an annular duct portion 33 into mixing duct portions 35 where the air is mixed with air flowing through the annular duct 31 between walls 42b and 9a. Combustion ducts 64 receive air from mixing duct portions 35 and have burners 37, not shown in FIG. 2, producing rearwardly directed streams of combustion gases out of combustion ducts 64 into a pair of ramjet bypass ducts 78 located on opposite sides of the annular walls 80 and 42a which bound the air duct means in which the turbojet 60 is located. The duct construction may also be modified, as shown in FIG. 1c.

Figure 2:
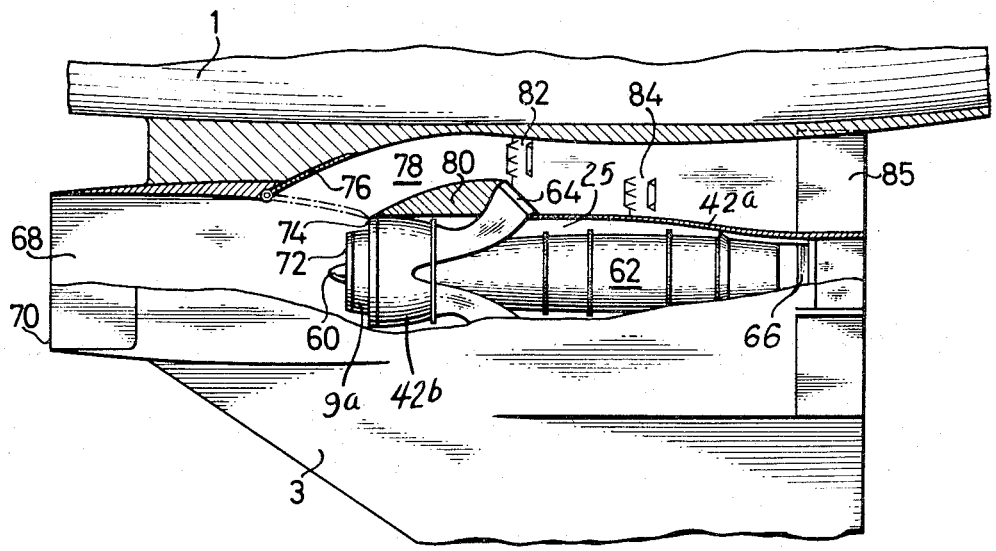
FIG. 2 is a fragmentary plan view, partially in a horizontal axial section, illustrating a second embodiment of the invention.
Figure 2A:
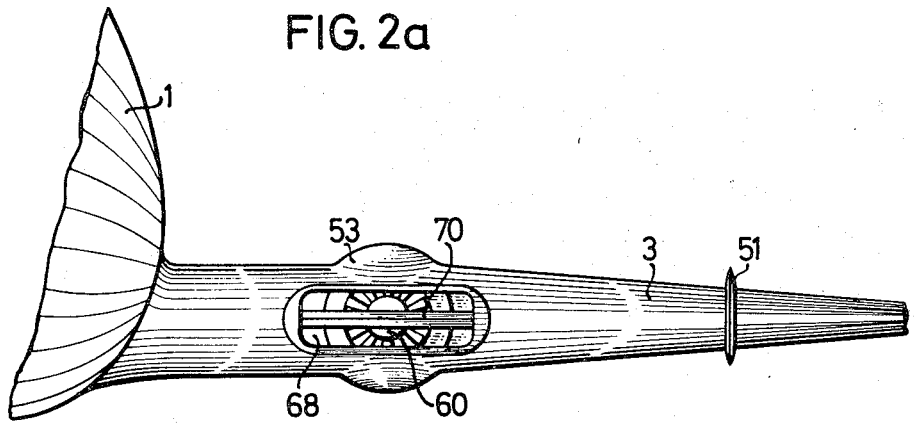
FIG. 2a is a front view of the embodiment of FIG. 2.

In the embodiment of FIGS. 2 and 2a, an inlet duct 68 having an open front end is located forwardly of bypass ducts 78 and the air duct 25. The inlets of bypass ducts 78 are located adjacent wall 9a of turbofan, and provided with flaps or other closure valve means 76 permitting opening, closing, and adjustment of the cross section of the inlets of bypass ducts 78. A blade-shaped air guide means 70 is located at the open front end of inlet duct 68.

Main burners 82 and after-burners 84 are located in the bypass ducts 78 whose outlets are provided with adjustable flow control means 85. The outlet nozzle 66 at the rear end of turbojet 62 is preferably also adjustable.

Part of the air entering through inlet duct 68 flows into the central air duct 72 formed by annular wall 9a into the turbojet, while another part enters through inlets 74 into the bypass ducts 78, if valve flap 76 is fully or partly opened.

The turbojet bypass engine illustrated in FIGS. 2 and 2a is operated as described with reference to the engine of FIGS. 1 and 1a. The air entering through annular inlet 72 into the turbojet is accelerated by the turbofan, compressed by the compressor, mixed with fuel, ignited, and discharged through outlet nozzle 66 after driving the turbine wheels and thereby the turbofan and compressor.

Part of the air accelerated by the turbofan is supplied to combustion conduits 64, mixed with fuel which is ignited so that combustion gases discharged from combustion ducts 64 into bypass ducts 78 exert an injector effect and draw air through inlet duct 68, inlet 74 of bypass ducts 78 and through the bypass ducts so that burners 82 and 84 produce combustion gases discharged from the outlets of bypass ducts 78 regulated by adjustable flow control means 85 and finally discharged to produce additional thrust at standstill of the aircraft or during comparatively slow movement of the same. Before the take-off of the aircraft, valve flaps 76 almost completely close bypass ducts 78 so that only small amounts of air enter bypass ducts 78 requiring the burning of a small amount of fuel by burners 82 and 84. When supersonic speeds are approached, valve flaps 76 are automatically opened and more fuel is supplied to burner means 82 and 84. At a speed of 2.2 Mach, the valve flaps are completely open, the air is rammed into the ramjet bypass ducts 78, and burners 82 and 84 are fully operative to produce great thrust so that the turbine 62 can be permitted to idle.

The embodiment of FIG. 2 has the advantage over the embodiment of FIG. 1 that the frontal resistance of the duct system is reduced by the inlet duct 68.

Figure 3:
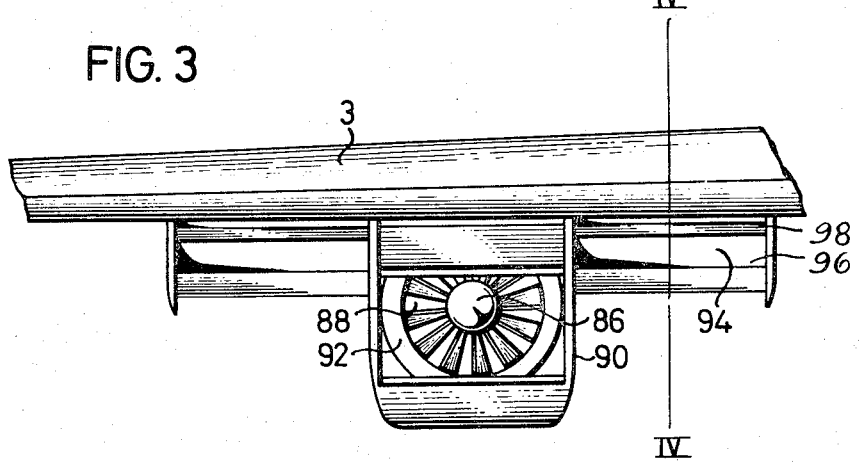
FIG. 3 is a fragmentary front view illustrating a third embodiment of the invention in which the turbojet bypass engine is mounted directly under a wing of an aircraft.
Figure 4:
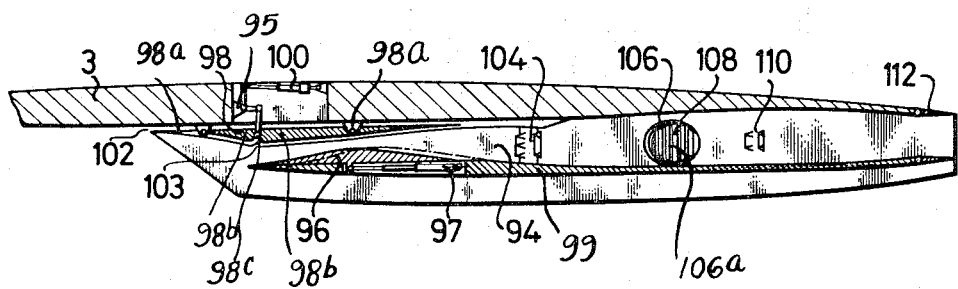
FIG. 4 is a fragmentary vertical sectional view taken on line IV—IV in FIG. 3, and illustrating air guide means in the ramjet bypass duct of the engine.

The embodiment of FIGS. 3 and 4 differs from the embodiments of FIGS. 1 and 2 inasmuch as the turbojet bypass engines 86 are not mounted in the wings 3 but directly under the wings. A support 90 is suspended from the bottom face of the wing and carries the turbojet bypass engine 86 whose turbofan 88 is visible in FIG. 3. The annular wall 92 in FIG. 3 corresponds to wall 42b described with reference to FIGS. 1 and 2 and it will be understood that any of the embodiments shown in FIGS. 1 and 2 can be used in the construction of FIGS. 3 and 4, insofar as the arrangement of the air ducts, combustion ducts, and of the turbojet is considered.

The construction of the ramjet bypass ducts 94 is somewhat modified as compared with the embodiments of FIGS. 1 and 2, since they are wider in the longitudinal direction of the wings due to the fact that more space is available under the wing than in the wing.

Within each ramjet bypass duct 94, air flow guiding means 96 and 98 are provided in the inlet region. Guiding means 96 and 98 are blade-shaped, and movable under control of the pilot. Pivot means 98a turnably support two guide parts 98b which are connected by a joint 98c operated by a linkage 95 which is controlled by a hydraulic servomotor 100 to displace the guide means 98 so that the leading edge of guide means 98b is moved toward and away from the bottom face of wing 3 to control the boundary layer of air so that a stable flow of air enters the ramjet bypass ducts 94 without turbulence. An air guide means 96 is mounted on a wall 99 for rectilinear movement, and is controlled by a hydraulic servomotor 97 to move between the positions shown in solid lines and the positions shown in chain lines. By displacement of air guide means 96, the shape of the inlet to the respective ramjet bypass ducts 94 can be changed, as required by the operational conditions. Main burner 104 and afterburner 110 are provided in each ramjet bypass duct 94 as described with reference to FIGS. 1 and 2, and located forwardly and rearwardly of the outlet 106 of combustion ducts 108 which correspond to combustion ducts 39 and 64 described with reference to FIGS. 1 and 2. A grill consisting of guide vanes 106a is provided in the outlet 106.

As explained with reference to FIGS. 1 and 2, combustion gases entering the ramjet bypass ducts 94 through outlet 106 of the combustion ducts have an injector effect to draw air between air guide means 98 and 96 into bypass ducts 94 while the aircraft is at a standstill or moves at a low speed.

By operation of air guide means 98 and 96, optimal flow conditions can be produced in the bypass ducts 94.

In all embodiments of the invention, the initial thrust of the turbojet is increased at low speeds of the aircraft at which the ramjets cannot operate, by drawing air into the bypass ducts by means of combustion gases derived from the turbojets and by burning fuel in the bypass ducts so that the same can operate as jet engines when the respective burners burn fuel in the streams of air flowing through the bypass ducts.

Shortly before a speed of 1 Mach is reached, the burners in the bypass ducts are supplied with a greater amount of fuel so that the thrust of the bypass ducts is increased, particularly since more air enters the same during forward movement of the aircraft. The aircraft rapidly accelerates until reaching the desired height and supersonic crusing speed at which sufficient air is rammed into the bypass ducts to permit operation of the same as ramjet engine which is obtained by supplying the necessary great amount of fuel through the burners in the bypass ducts.

In a manner which is not an object of the present invention, the supply of fuel to the burners, and the operation of the air flow control means 96, 98, 49, 85, 66, and 112, and of the valve flap 26 and 76 is automatically carried out and at a proper moment. When the ramjets are fully effective, the turbojet is operated at idling speed.

It is an advantage of the invention that in the event of failure of a turbojet, air supplied through air duct 31 to combustion duct 39, and fuel burned by burners 37 in combustion ducts 39, permits the operation of the bypass ducts 41, 78, 94 with the respective burners as jet engines so that the flight can be continued particularly if the turbojet of only one of several turbo bypass engines fails. During descent and while the aircraft is in a waiting pattern over an air field, the burners of the bypass ducts need not be operated, the thrust produced by the turbojets and by the combusion gases discharged from the combustion ducts into the bypass ducts being sufficient.

It will be understood that each of the elements described above, or two or more together, may also find a useful application in other types of jet engines, differing from the types described above.

While the invention has been illustrated and described as embodied in a turbojet bypass engine having means for operating ramjet bypass ducts at low speed of the aircraft, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Turbojet bypass engine for an aircraft, comprising in combination, a duct system including air duct means having a first front inlet and a first rear outlet, ramjet bypass duct means having a second front inlet and a second rear outlet, combustion duct means connecting said air duct means with said ramjet bypass duct means, and overflow duct means connecting said air duct means with said ramjet bypass duct means forwardly of said combustion duct means; turbojet means located in said air duct means for producing a thrust at said first rear outlet; and fuel burner means in said combustion duct means for producing a flow of combustion gases out of the same, into said ramjet bypass duct means, and out of said second rear outlet so that air is drawn by the injector effect of said flow of combustion gases through said second front inlet into said ramjet bypass duct means while the aircraft is at a standstill or moves at low speed.

2. Turbojet bypass engine according to claim 1 and including means operable to open and close said overflow duct means.

3. Turbojet bypass engine for an aircraft, comprising, in combination, a duct system including air duct means having a first front inlet and a first rear outlet, ramjet bypass duct means having a second front inlet and a second rear outlet, and combustion duct means connecting said air duct means with said ramjet bypass duct means; turbojet means located in said air duct means for producing a thrust at said first rear outlet, said turbojet means including a turbofan located forwardly of said combustion duct means for blowing air into said combustion duct means, said air duct means including an air duct portion adjacent said turbofan and connected with said combustion duct means for directly supplying air from said first front inlet to said combustion duct means; and fuel burner means in said combustion duct means receiving air through said air duct means from said turbofan, and also directly from said air duct portion, said fuel burner means producing a flow of combustion gases out of said combustion duct means into said ramjet bypass duct means and out of said second rear outlet so that air is drawn by the injector effect of the flowing combustion gases through said second front inlet into said ramjet bypass duct means while the aircraft is at a standstill or moves at low speed.

4. Turbojet bypass engine according to claim 3, and including overflow duct means connecting said air duct means with said ramjet bypass duct means forwardly of said combustion duct means.

5. Turbojet bypass engine according to claim 3 wherein said combustion duct means are curved and have a rearwardly facing outlet and a forwardly located inlet disposed in radial direction with respect to the axis of rotation of said turbofan means inwardly of said last mentioned outlet.

6. Turbojet bypass engine for an aircraft, comprising, in combination, a duct system including air duct means having a first front inlet and a first rear outlet, ramjet bypass duct means having a second front inlet and a second rear outlet, and combustion duct means connecting said air duct means with said ramjet bypass duct means and having outlet nozzle means for discharging a flow of combustion gases rearwardly into said ramjet bypass duct means, said ramjet bypass duct having a free cross section in the region of said outlet nozzle means; turbojet means located in said air duct means for producing a thrust at said first rear outlet; first burner means in said combustion duct means for producing a flow of combustion gases out of said outlet nozzle means into said ramjet bypass duct means and out of said second rear outlet so that said combustion gases exert an injector effect for drawing air directly from said second front inlet into said ramjet bypass duct means while the aircraft is at a standstill or moves at low speed; and second fuel burner means in said ramjet bypass duct means for burning fuel with air drawn into said ramjet bypass duct means by the flow of combustion gases while the aircraft is at a standstill or moves at low speed whereby thrust is produced at said second rear outlet, or with air rammed into said ramjet bypass duct means when the aircraft moves at high speed, said second burner means including a main burner located forwardly of said combustion duct means, and an after-burner located rearwardly of said main burner.

7. Turbojet bypass engine according to claim 6 wherein said ramjet bypass duct means include two bypass ducts located on opposite sides of said air duct means and turbojet means; wherein said combustion duct means include two combustion ducts respectively connecting said air duct means with said two bypass ducts; wherein said fuel burner means include two first burners respectively located in said combustion ducts and wherein said second burner means includes a main burner located forwardly of said combustion duct means in each of said bypass ducts, and an after-burner located in each of said bypass ducts rearwardly of said main burner.

8. Turbojet bypass engine according to claim 6 wherein said turbojet means include a forwardly located turbofan; wherein said combustion duct means are connected with a portion of said air duct means located so that said turbofan blows air into said combustion duct means; wherein said ramjet bypass duct means include two bypass ducts located on opposite sides of said air duct means and turbojet means; wherein said combustion duct means include two combustion ducts respectively connecting said air duct means with said two bypass ducts; wherein said first burner means include two first burners respectively located in said combustion ducts; and wherein said second burner means include a main burner located forwardly of said combustion duct means in each of said bypass ducts, and an after-burner located in each of said bypass ducts rearwardly of said main burner.

9. Turbojet bypass engine according to claim 6 wherein said duct system includes an inlet duct having an open front end and being located forwardly of said first and second front inlets of said air duct means and said ramjet bypass duct means and communicating with the same.

10. Turbojet bypass engine according to claim 6 including flow control means located in said duct system for controlling and adjusting the flow of gases through the same.

11. Turbojet bypass engine according to claim 10 wherein said flow control means include adjustable means located at at least one of said rear outlets for varying the cross section of the same.

12. Turbojet bypass engine according to claim 10 wherein said flow control means include air guide means located at at least one of said front inlets.

13. Turbojet bypass engine according to claim 10 wherein said flow control means include movable air guide means disposed at the front end of said ramjet bypass duct means and being operable and adjustable for varying the amount of air flowing into said second front inlet of said ramjet bypass duct means.

14. Turbojet bypass engine according to claim 10 wherein said duct system includes an inlet duct having an open front end and being located forwardly of said first and second front inlets and communicating with said air duct means and said ramjet bypass duct means; and wherein said flow control means include means for opening and closing said second front inlet and for adjusting the amount of air flowing from said inlet duct into said ramjet bypass duct means.

15. Turbojet bypass engine according to claim 10 wherein said turbojet means include a turbine having an exhaust thrust nozzle; and wherein said flow control means include adjustable means located at said first rear outlet rearwardly of said exhaust thrust nozzle for controlling the flow of combustion gases discharged by the same.

16. Turbojet bypass engine according to claim 10 wherein said duct system is located directly under a wing of said aircraft; and wherein said flow control means include adjustable air guide means located in said ramjet bypass duct means at said second front inlet for guiding selected amounts of air into said ramjet bypass duct means.

17. Turbojet bypass engine according to claim 16 wherein said adjustable air guide means includes first guiding means directly adjacent the wing and operable for controlling the boundry layer of air, and second guiding means forming with said first guiding means said second front inlet and being operable for varying the shape of said second inlet.

References Cited

UNITED STATES PATENTS

| | | | |
|---|---|---|---|
| 2,970,431 | 2/1961 | Harshman | 60—35.6 X |
| 3,103,102 | 9/1963 | Sargent et al. | 60—35.6 X |
| 3,149,461 | 9/1964 | Eichholtz | 60—35.6 |
| 3,161,018 | 12/1964 | Sandre | 60—262 |

FOREIGN PATENTS

| | | |
|---|---|---|
| 997,495 | 11/1950 | France. |
| 1,086,315 | 8/1954 | France. |
| 727,136 | 3/1955 | Great Britain. |
| 774,059 | 5/1957 | Great Britain. |

OTHER REFERENCES

Flight, June 9, 1949, page 672 relied on.

CARLTON R. CROYLE, *Primary Examiner.*

MARK NEWMAN, *Examiner.*

D. HART, *Assistant Examiner.*